US012811792B2

(12) United States Patent
Tsehori

(10) Patent No.: US 12,811,792 B2
(45) Date of Patent: Nov. 24, 2026

(54) ZERO-KNOWLEDGE ENCRYPTION ARCHITECTURE FOR CONTENT MANAGEMENT SYSTEMS

(71) Applicant: Dropbox, Inc., San Francisco, CA (US)

(72) Inventor: Gilad Gabriel Tsehori, Savyon (IL)

(73) Assignee: Dropbox, Inc., San Francisco, CA (US)

( * ) Notice: Subject to any disclaimer, the term of this patent is extended or adjusted under 35 U.S.C. 154(b) by 328 days.

(21) Appl. No.: 18/147,461

(22) Filed: Dec. 28, 2022

(65) Prior Publication Data

US 2024/0223375 A1 Jul. 4, 2024

(51) Int. Cl.
*H04L 9/32* (2006.01)
*H04L 9/08* (2006.01)

(52) U.S. Cl.
CPC .......... *H04L 9/3226* (2013.01); *H04L 9/0863* (2013.01)

(58) Field of Classification Search
CPC ...... H04L 9/3226; H04L 9/0863; H04L 9/085
USPC .......................................................... 713/155
See application file for complete search history.

(56) References Cited

U.S. PATENT DOCUMENTS 5,315,658 A * 5/1994 Micali ...................... H04K 1/00 713/180
6,026,163 A * 2/2000 Micali ................. G06Q 50/188 705/75
9,461,949 B2 * 10/2016 Grue ................... H04L 67/1095
9,509,509 B2 * 11/2016 van Rossum ......... H04L 63/145
RE46,439 E 6/2017 Schneider et al.
9,716,720 B2 * 7/2017 Adams ................. G06Q 10/101
9,961,053 B2 5/2018 Yedidi et al.
10,013,728 B2 7/2018 Schechter et al.
10,091,174 B2 * 10/2018 Mityagin ................ H04L 63/08
10,140,467 B1 * 11/2018 Xu ................... H04N 21/25816
10,142,309 B2 * 11/2018 Kaplan ................... G06F 21/34
10,187,464 B2 * 1/2019 Goldberg ............ H04L 67/1097
10,380,551 B2 8/2019 Piyush et al.
10,425,391 B2 * 9/2019 Mityagin ............ H04L 63/0428
10,432,397 B2 10/2019 Maron et al.
10,505,723 B1 * 12/2019 Griffin .................... H04L 9/085
10,586,066 B2 3/2020 Niu et al.
10,650,155 B2 * 5/2020 Staley ................. G06F 21/6245
10,817,476 B2 10/2020 Niu et al.
10,848,556 B2 11/2020 Motes et al.
(Continued)

OTHER PUBLICATIONS

Jajodia S., et al., "Securing Password Recovery through Dispersion," 2012 Fourth International Conference on Computational Aspects of Social Networks (CASoN), Jan. 17, 2013, pp. 228-233.
(Continued)

*Primary Examiner* — Taghi T Arani
(74) *Attorney, Agent, or Firm* — Keller Preece PLLC

(57) ABSTRACT

A client device initiates an enrollment process between the client device and a content management system. The client device generates an access code for encrypting and/or decrypting content items associated with a user account. The access code is not entirely exposed to the content management system. The client device establishes a recovery process for recovering the access code. Establishing the recovery process includes generating a plurality of shares of the access code and distributing the plurality of shares to a plurality of trusted devices. At least a subset of the plurality of shares is required for reconstructing the access code.

20 Claims, 8 Drawing Sheets

(56) References Cited

U.S. PATENT DOCUMENTS

| | | | | |
|---|---|---|---|---|
| 10,984,444 | B2 * | 4/2021 | Mody | G06Q 30/0255 |
| 11,003,760 | B2 | 5/2021 | Machani | |
| 11,194,767 | B2 * | 12/2021 | Kaplan | G06F 16/94 |
| 11,372,990 | B2 | 6/2022 | Mityagin | |
| 11,595,208 | B2 * | 2/2023 | Richards | H04L 63/0435 |
| 11,979,507 | B2 * | 5/2024 | Fletcher | H04L 9/085 |
| 2011/0010299 | A1 * | 1/2011 | Byrne | H04L 69/04 713/150 |
| 2014/0189355 | A1 * | 7/2014 | Hunter | H04L 63/0428 713/171 |
| 2015/0163261 | A1 * | 6/2015 | Mahkovec | G06F 21/6218 709/204 |
| 2015/0178516 | A1 * | 6/2015 | Mityagin | H04L 63/105 707/783 |
| 2015/0180846 | A1 * | 6/2015 | Nguyen | G06F 21/41 726/7 |
| 2015/0222615 | A1 * | 8/2015 | Allain | H04L 67/55 726/4 |
| 2015/0244522 | A1 * | 8/2015 | Cheruvath | G06F 21/31 713/183 |
| 2015/0319175 | A1 * | 11/2015 | Subramani | G06F 21/6218 726/1 |
| 2015/0347996 | A1 * | 12/2015 | Alsina | G06Q 10/063114 726/28 |
| 2017/0005797 | A1 * | 1/2017 | Lanc | H04L 63/20 |
| 2017/0032373 | A1 * | 2/2017 | Adams | G06Q 20/405 |
| 2019/0121994 | A1 * | 4/2019 | Embiricos | G06F 21/6218 |
| 2020/0259651 | A1 * | 8/2020 | Mohassel | H04L 9/3218 |
| 2020/0372045 | A1 * | 11/2020 | Goldberg | G06F 16/11 |
| 2020/0374113 | A1 | 11/2020 | Noam et al. | |
| 2021/0319418 | A1 * | 10/2021 | Alsina | G06F 21/1012 |
| 2021/0367778 | A1 | 11/2021 | Hamel et al. | |
| 2022/0029804 | A1 * | 1/2022 | Richards | H04L 9/0861 |
| 2022/0188273 | A1 * | 6/2022 | Koorapati | G06F 16/9574 |
| 2022/0271933 | A1 * | 8/2022 | Chen | H04L 9/085 |
| 2023/0308287 | A1 * | 9/2023 | Pettit | H04L 9/50 |
| 2023/0394470 | A1 * | 12/2023 | Mancuso | G06Q 20/12 |
| 2024/0163082 | A1 * | 5/2024 | Van Kempen | H04L 9/0861 |
| 2024/0223375 | A1 * | 7/2024 | Tsehori | H04L 9/0863 |

OTHER PUBLICATIONS

Kerim S., "What will the "Account Recovery" functionality look like?," Passbolt, Sep. 28, 2021, Retrieved from Internet URL: https://blog.passbolt.com/what-will-the-account-recovery-functionality-look-like-24bac800fc59, Retrieved on Dec. 8, 2022, 11 pages.

* cited by examiner

200

ZERO-KNOWLEDGE ENCRYPTION ARCHITECTURE FOR CONTENT MANAGEMENT SYSTEMS

TECHNICAL FIELD

Embodiments disclosed herein generally relate to a secure storage system and, more specifically, to a system and method for recovering a user's access code for accessing their content in a content management system employing a zero-knowledge encryption architecture.

BACKGROUND

Malicious actors are frequently trying to gain access to users' personal information. One of the ways that these malicious actors attempt to gain access to a user's personal data is by stealing the user's login credentials (e.g., account identifier, password, etc.) for an account (e.g., email account, cloud storage account, personal bank account, etc.) and using the user's login credentials to access the user's personal information stored in a corresponding account.

SUMMARY

In some embodiments, a method is disclosed herein. A client device initiates an enrollment process between the client device and a content management system. The client device generates an access code for encrypting and/or decrypting content items associated with a user account. The access code is not entirely exposed to the content management system. The client device establishes a recovery process for recovering the access code. Establishing the recovery process includes generating a plurality of shares of the access code and distributing the plurality of shares to a plurality of trusted devices. At least a subset of the plurality of shares is required for reconstructing the access code.

In some embodiments, a method is disclosed herein. A first trusted client device initiates a recovery process for recovering an access code associated with a main client device. The access code is used by the main client device for encrypting and/or decrypting content items associated with a user account of a content management system. The access code is not entirely exposed to the content management system. The first trusted client device prompts a plurality of trusted client devices. Each trusted client device of the plurality of trusted client devices has access to a share of the access code. A threshold number of shares is required for reconstructing the access code. The first trusted client device receives a plurality of shares from the plurality of trusted client devices. The first trusted client device determines that the plurality of shares includes at least the threshold number of shares. Responsive to the determining, the first trusted client device reconstructs the access code by evaluating the plurality of shares.

In some embodiments, a method is disclosed herein. A content management system stores a content item. The content item is encrypted prior to receipt at the content management system with an access code. The content management system does not have access to the access code. The content management system receives a request to access the content item from a first client device. The request includes the access code associated with the content item. Responsive to identifying the access code associated with the content item, the content management system provides the content item to the first client device. The content management system receives a second request from the first client device to transfer the access code to a second client device. Responsive to receiving the second request, the content management system transfers the access code to the second client device without exposing the access code to the content management system.

BRIEF DESCRIPTION OF THE DRAWINGS

The above-recited and other advantages and features of the disclosure will become apparent by reference to specific embodiments thereof, which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings.

DETAILED DESCRIPTION

Embodiments disclosed herein generally relate to a secure storage system and, more specifically, to a system and method for recovering a user's access code for accessing their content in a content management system employing a zero-knowledge encryption architecture.

Zero-knowledge encryption architectures allow a user to store their content items on a server without the owner of the server having access to or being aware of the content underlying the content items. This is because the content items are encrypted prior to upload to the server. For example, a user may generate a locally maintained access key that is used to encrypt and decrypt content items prior to upload. To maintain the zero-knowledge encryption architecture, the access key may never be known by the server hosting the encrypted content.

One of the downsides, however, to zero-knowledge encryption architectures is that unlike system that do not employ zero-knowledge encryption architectures, because the server has no knowledge of the access key, the server would be unable to restore or reset the access key. For example, in a non-zero knowledge encryption architecture, the server could reset the user's password upon receiving a password reset request. As a result, if the user loses their access key in a zero-knowledge encryption environment, they would be unable to ever decrypt their encrypted content items. Thus, their content is lost forever.

To address this deficiency, one or more techniques discussed herein provide a zero-knowledge encryption architecture in which the user can recover their access code by utilizing a shared secret protocol. For example, the user may divide their access code into shares and may distribute those shares to trusted users. If the user loses their access code, the user could reconstruct their access code by accessing and evaluating a threshold number of shares. Therefore, the user's encrypted content items that would otherwise be forever encrypted can now be accessed.

Figure 1:
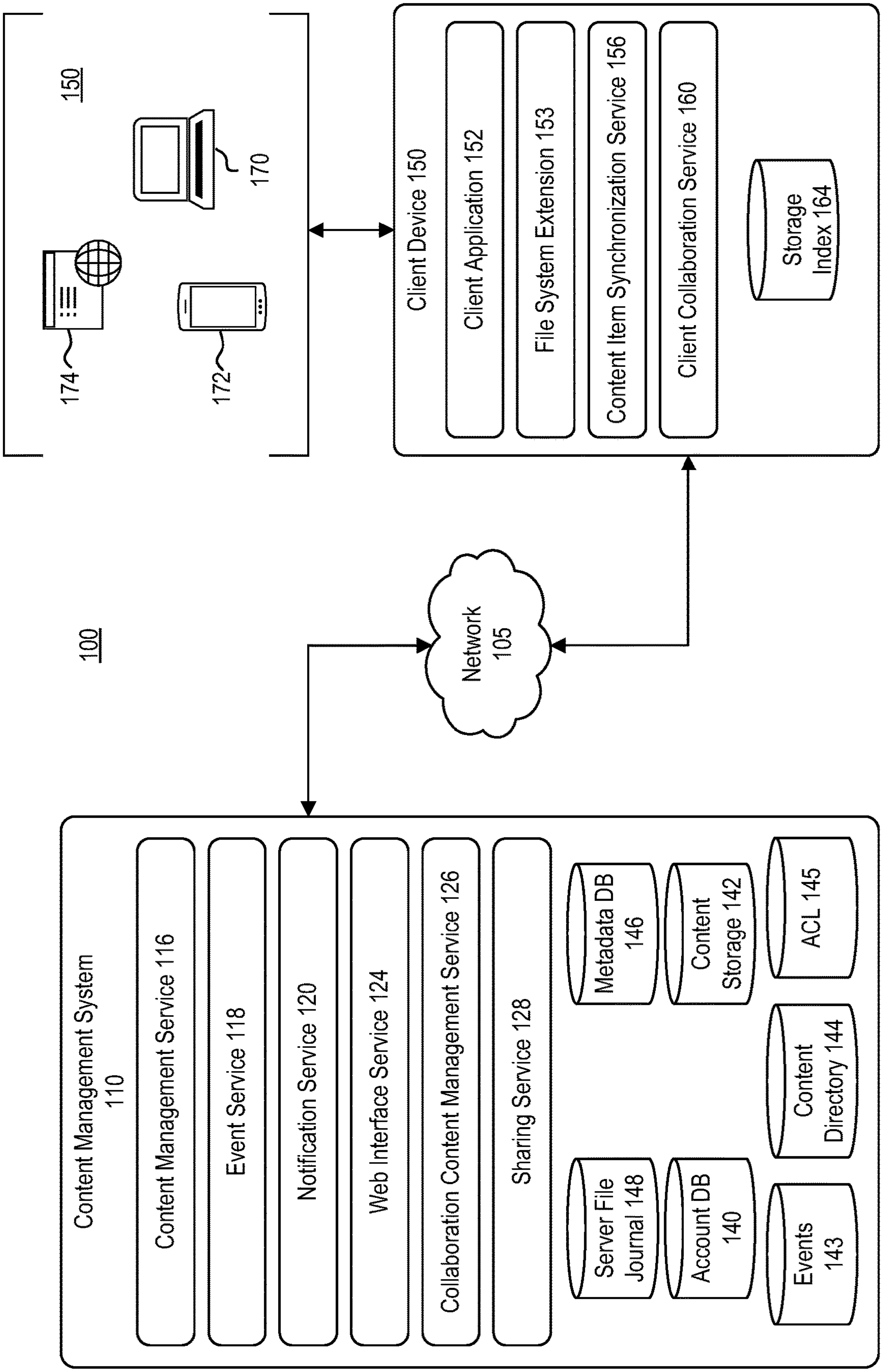
FIG. 1 illustrates an example system configuration of a content management system and client devices, according to example embodiments.

FIG. 1 is a block diagram illustrating a system 100, according to example embodiments. System 100 may include a content management system 110 interacting with a client device 150.

Content management system 110 may include one or more components. For example, as illustrated, content management system 110 may include content management service 116, event service 118, notification service 120, web interface service 124, collaboration content management service 126, and sharing service 128. In some embodiments, content management system 110 may further include one or more storage items. Such storage items may include, but are not limited to, server file journal 148, account database 140, events 143, content directory 144, access control list (ACL) 145, content storage 142, and metadata database 146.

Content management system 110 may communicate with client device 150 via network 105. Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in system 100 to send and receiving information between the components of system 100.

Client device 150 may include one or more components. For example, as illustrated, client device 150 may include client application 152, content item synchronization service 156, file system extension 153, and client collaboration service 160. In some embodiments, client device 150 may further include one or more storage components. As illustrated, client device 150 may include storage index 164.

Accounts

Content management system 110 can store content items in association with accounts, as well as perform a variety of content item management tasks, such as retrieve, modify, browse, and/or share the content item(s) (e.g., collaboration documents). Furthermore, content management system 110 can enable an account to access collaboration document(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g., various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of collaboration documents while an engineering group can have access to another set of collaboration documents. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, messages, etc. A content item can also include collections or other mechanisms for grouping content items together with different behaviors, such as folders, zip files, playlists, albums, etc. A collection can refer to a folder, or a plurality of content items that are related or grouped by a common attribute. Content items can also include hyperlinks, shortcuts or placeholder files storing metadata identifying other content items, such as other content items stored on content management system 110 or on a third-party content management system. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 can be a computing device having a local file system accessible by multiple applications resident thereon. Client device 172 can be a computing device wherein content items are only accessible to a specific application or by permission given by the specific application, and the content items are stored either in an application specific space or in the cloud. Client device 174 can be any client device accessing content management system 110 via a web browser and accessing content items via a web interface. While example client devices 170, 172, and 174 are depicted in form fusers such as a laptop, mobile device, or web browser, it should be understood that the descriptions thereof are not limited to devices of these example form fusers. For example, a mobile device such as client device 172 might have a local file system accessible by multiple applications resident thereon, or client device 172 might access content management system 110 via a web browser. As such, the form fuser should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content item synchronization service 156. The synchronization can be platform agnostic. That is, content can be synchronized across multiple client devices of varying type, capabilities, operating systems, etc. Content item synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, delete, add, modify, etc. commands relative to content items in the designated location of the file system of client device 150.

When file system extension 153 notices a write, move, copy, or delete command, it can notify content item synchronization service 156, which can synchronize the changes to content management service 116. In some embodiments, content item synchronization service 156 can perform some functions of content management service 116 including functions addressed above such as dividing the content item into blocks, hashing the content item to generate a unique identifier, etc. Content item synchronization service 156 can index content within client storage index 164 and save the result in storage index 164. Indexing can include creating a unique identifier for each content item. In some embodiments, content item synchronization service 156 creates this unique identifier by putting the data of the content item (e.g., excluding the filename and/or other metadata) through a hash function; as addressed above, content management system can use a similar process to provide identifiers to content on content management system 110.

Content item synchronization service 156 can use storage index 164 to facilitate the synchronization of at least a portion of the content within client storage with content associated with a user account on content management system 110. For example, content item synchronization service 156 can compare storage index 164 with content management system 110 and detect differences between content on client storage and content associated with a user account on content management system 110. Content item synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 120. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 118 can generate an event for such interaction. When event service 118 detects a user interaction with a content item and/or another user, event service 118 can create an event identifier (e.g., unique event identifier) and event type, and associate the event identifier and event type with the user (e.g., user identifier and namespace identifier) to create an event or event record for the interaction. After the event is created, event service 118 can send the event identifier and any information associated with the event to events 143 for storage.

Events 143 can include one or more storage systems, such as one or more databases, for storing events and associated information. In some examples, events 143 can include a distributed database or distributed storage system. Events 143 can receive and store the event data for access by content management system 110.

Presence and Seen State

Content management system 110 can provide information about how users are interacting or have interacted with a content item, such as a shared content item. Content management system 110 can report that a user with whom a content item is shared is currently viewing the content item. For example, client collaboration service 160 can notify notifications service 120 when client device 150 is accessing the content item. Notify notifications service 120 can notify client devices of other users having access to the same content item of the presence of the user of client device 150 with respect to the content item. Content management system 110 (e.g., event service 118) and/or client device 150 can track user interactions with content, such as read or write events, and maintain a history of such events and interactions for a user (e.g., events 143).

Content management system 110 can report a history of user interactions with a shared content item. Collaboration content management service 126 can query data sources such as events 143, metadata database 146, and server file journal 148 to determine that a user has saved the content item, that a user has yet to view the content item, etc., and disseminate this status information using notification service 120 to other users so that they can know who currently is or has viewed or modified the content item.

Collaboration content management service 126 can facilitate comments associated with content, even if a content item does not natively support commenting functionality. Such comments can be stored in metadata database 146.

Collaboration content management service 126 can originate and transmit notifications for users. For example, a user can mention another user in a comment and collaboration content management service 126 can send a notification to that user that he has been mentioned in the comment. Various other content item events can trigger notifications, including deleting a content item, sharing a content item, etc.

Collaboration content management service 126 can provide a messaging platform whereby users can send and receive instant messages, voice calls, emails, etc.

Collaboration Content Items

Collaboration content management service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by client application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively, or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. In addition, in some embodiments, some portions or components of content management system 110 described herein may be included in or integrated with one or more client devices 150. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
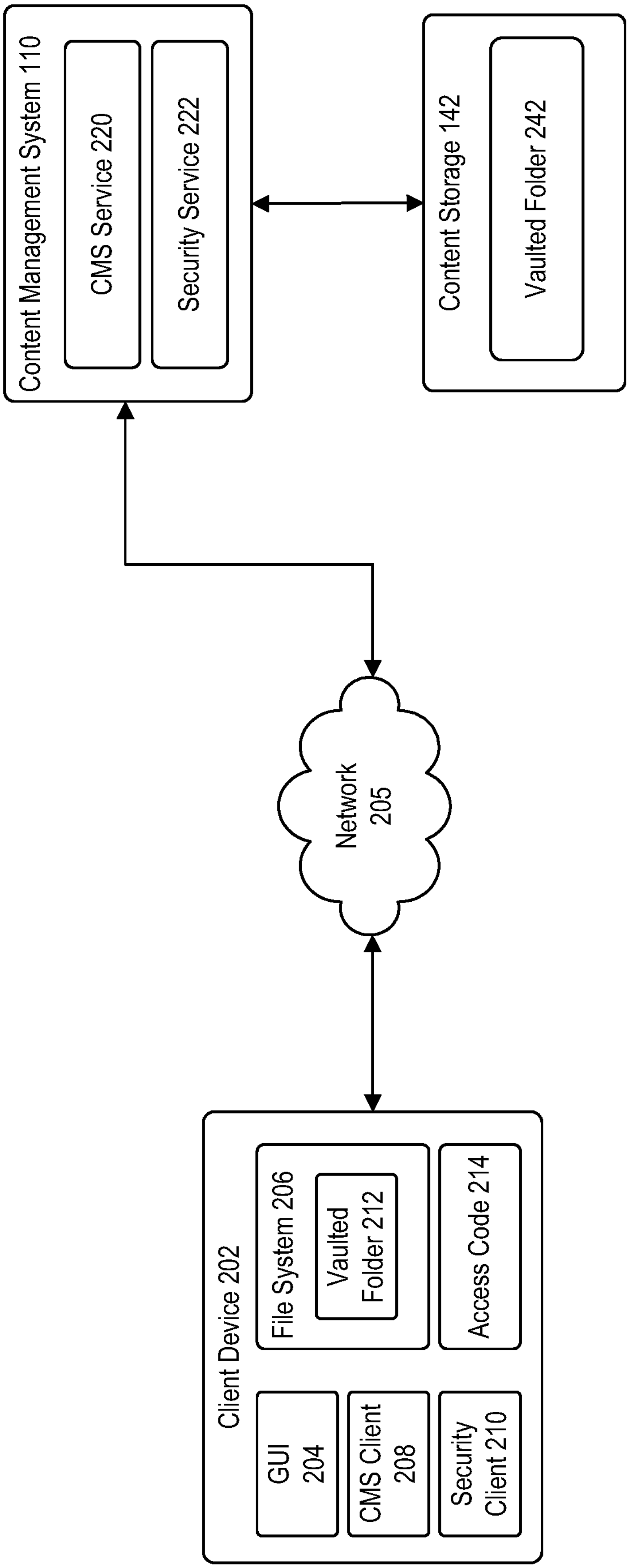
FIG. 2 illustrates an example system configuration of the content management system and a client device of FIG. 1, according to example embodiments.

FIG. 2 is a block diagram of an example system 200, according to example embodiments. In some embodiments, system 200 may correspond to system 100 described above.

As illustrated, system 200 may include client device 202 and content management system 110 communicating via network 205. Network 205 may be configured similar to network 105.

A user of client device 202 (e.g., client device 150) may create an account with content management system 110. Client device 202 may include a graphical user interface (GUI) 204, a file system 206, a content management system (CMS) client 208, and a security client 210. User of client device 202 may view one or more content items (e.g., files, links, folders, workspaces, photos, passwords, etc.) associated with a user account via GUI 204. For example, GUI 204 may provide user of client device 202 with access to content items associated with the user's account.

File system 206 may be representative of a portion (e.g., a dedicated folder) of the file system of client device 202 that includes content items being managed by content management system 110. In some embodiments, content items stored in file system 206 may be automatically uploaded to or synchronized with file systems in content management system 110 and/or managed file systems on other client devices.

CMS client 208 may be configured to authenticate the user with content management system 110. For example, CMS client 208 may be configured to initiate an authentication process during which a user may log in to their account managed by content management system 110. In some embodiments, CMS client 208 may further be configured to manage file system 206. When a user adds a content item to file system 206, CMS client 208 may communicate with content management system 110 to synchronize the content item with content management system 110, as described with reference to FIG. 1 above. Similarly, CMS client 208 may monitor items in file system 206 to determine when content items may have been opened, modified, moved, shared, deleted, etc., and which user has performed or is performing operations on the content items within file system 206.

As shown, in some embodiments, file system 206 may include a vaulted folder 212. Vaulted folder 212 may include one or more content items that are encrypted prior to upload to content management system 110. In this manner, a user of client device 202 can take advantage of secure storage functionality of content management system 110.

In some embodiments, vaulted folder 212 may encompass an entirety of the user's account. For example, all content items associated with the user's account may be encrypted prior to upload to content management system 110.

In some embodiments, vaulted folder 212 may encompass a portion of the user's account. For example, a user's account may include vaulted folder 212 and an unvaulted folder. The unvaulted folder may store content items that are not encrypted prior to upload. In other words, an access code may not be needed to access content items stored in unvaulted folder. In this manner, content management system 110 may have access to the underlying content of content items that may be stored in the unvaulted folder. Thus, content management system 110 may be configured to store both encrypted content items and unencrypted content items.

Security client 210 may be configured to create vaulted folder 212 by enrolling the user into secure storage functionality. For example, security client 210 may send a request to content management system 110 for the user to be enrolled with in secure storage functionality. Upon receiving approval from content management system 110 for the user to take advantage of secure storage functionality, security client 210 may generate an access code 214 for the user. Access code 214 may be used by security client 210 for locally encrypting content items prior to being added to vaulted folder 212. Similarly, access code 214 may be used by security client 210 for locally decrypting encrypted content items added to vaulted folder 212.

In some embodiments, access code 214 may be used to access the user's account itself. For example, in addition to or in lieu of log-in information (e.g., username and password), a user may utilize access code 214 to access their account with content management system 110. In this manner, all content items contained in or otherwise associated with the user's account may be encrypted prior to upload.

Content management system 110 may include content management system (CMS) service 220 and security service 222. CMS service 220 may be representative of one or more modules discussed above in reference to FIG. 1. For example, CMS service 220 may track a user's interaction with content items associated with the user's account. In some embodiments, the interactions may include, but are not limited to, editing, adding, posting, sharing, deleting, commenting, moving, renaming, and otherwise interacting with or manipulating the content items. Using a specific example, CMS service 220 may track when a user adds a content item to a folder, edits a content item, shares a content item (e.g., a folder or a file) with another user, deletes a content item (e.g., a file or folder), shares a link to a content item, and the like.

As indicated above, a user can generate a vaulted folder 212 that stores encrypted content items. Contents of vaulted folder 212 may be managed by content management system 110. In some embodiments, encrypted content items stored in vaulted folder 212 may be automatically uploaded to or synchronized with file systems in content management system 110 and/or managed file systems on other client devices. Because content items in vaulted folder 212 are encrypted prior to storage in vaulted folder 212, the content uploaded to or synchronized with file systems in content management system 110 is inaccessible to content management system 110. In this manner, content management system 110 may employ a zero-knowledge encryption architecture for users with vaulted folders.

Security service 222 may manage vaulted folders associated with end users. In some embodiments, security service 222 may facilitate an enrollment process, during which a user of client device 202 can enroll with secure storage functionality of content management system 110. For example, when a user requests to enroll in secure storage functionality with content management system 110, security service 222 may prompt the user to locally generate access code 214 using a local security manager executing on their client device (e.g., client device 202). To maintain integrity of the zero-knowledge architecture, access code 214 cannot be known to content management system 110. Thus, security service 222 may instruct client device 202 to store access code 214 locally at client device 202.

Because content management system 110 employs a zero-knowledge architecture, security service 222 does not store, does not have access to, and cannot restore a user's access code 214 if the user loses the access code. Thus, should a user lose their access code 214, the user would be unable to access their encrypted content items in vaulted folder 242 and/or vaulted folder 212.

To avoid this, security client 210 may prompt the user to enroll the user in an access code recovery process. The recovery process may allow the user to recover access code 214. Security client 210 may utilize a secret sharing algorithm to distribute a plurality of shares of the user's access code to a plurality of other user, such that a subset of the plurality of shares can be used by any user to reconstruct access code 214. Once reconstructed, the user can use access code 214 to access their encrypted items in vaulted folder 242 and/or vaulted folder 212.

In some embodiments, security client 210 may allow the user to define constraints of the shared secret algorithm. In some embodiments, security client 210 may allow the user to define a number of shares of access code 214 to distribute. For example, a user may request that access code 214 be split into n shares. In some embodiments, security client 210 may allow to the user to define a minimum number of shares, m, required to construct access code 214. In some embodiments, the minimum number of shares, m, may be less than the n shares that are generated. In some embodiments, the minimum number of shares, m, may be equal to the n shares that are generated.

In some embodiments, once the number of shares is determined, security client 210 may allow the user to indicate their desired recipients of those shares. For example, a user may provide security client 210 with a list of identifiers (e.g., email addresses or user account identifiers) of their trusted users. Security client 210 may then provide each trusted user with their share of access code 214 for local storage.

When prompted, any trusted user can construct access code 214 utilizing the minimum number of shares, m. In some embodiments, security client 210 may encrypt access code 214 prior to splitting access code 214 into the n shares using a key stored local to client device 202. By encrypting access code 214 prior to generating the n shares, security client 210 may guard against any single trusted user from having access to access code 214, such as when a trusted user reconstructs access code 214.

In some embodiments, security client 210 may require that a trusted user be content management system 110. For example, security client 210 or the user may request that content management system 110 be a trusted user of the plurality of trusted users having a share of access code 214. In some embodiments, security client 210 or the user may require that content management system 110 be a party to the minimum number of shares, m, needed to reconstruct access code 214.

In some embodiments, security client 210 may prompt the user to define a duration, d. The duration d may indicate a time frame after which a trusted user would be able to initiate the recovery process. For example, content management system 110 may track the dates and times that the user accessed vaulted folder 212. Typically, a user may not need to recover their access code, if they previously had accessed vaulted folder 212 within a short amount of time. For example, if a user last accessed their vaulted folder 212 five minutes ago, it is unlikely that the user would lose access to access code 214. However, if the user last accessed their vaulted folder six months ago, it may be more likely that the user would lose access to access code 214. Accordingly, d may represent the threshold amount of time from the user's last access that must pass before permitting a trusted user to initiate a recovery process.

Figure 3C:
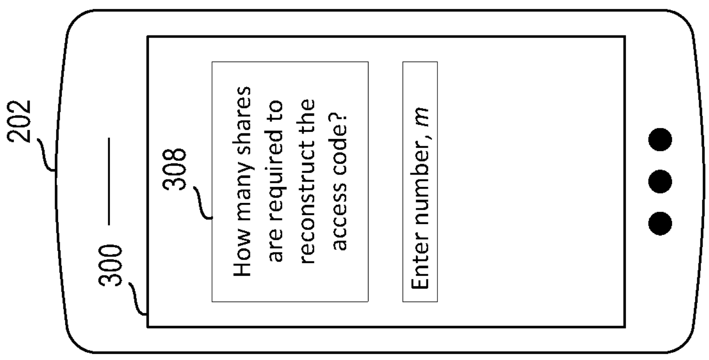
FIG. 3C illustrates an example view of a graphical user interface, according to example embodiments.
Figure 3B:
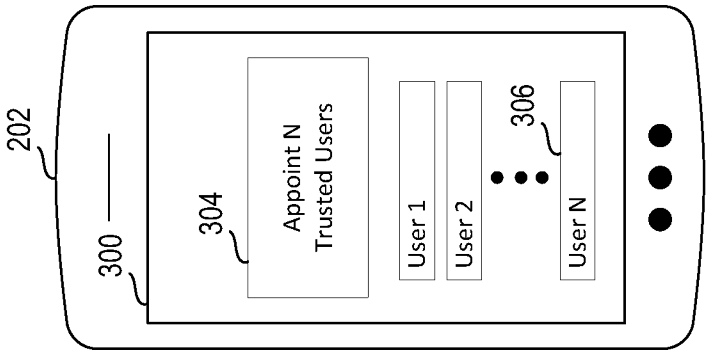
FIG. 3B illustrates an example view of a graphical user interface, according to example embodiments.
Figure 3A:
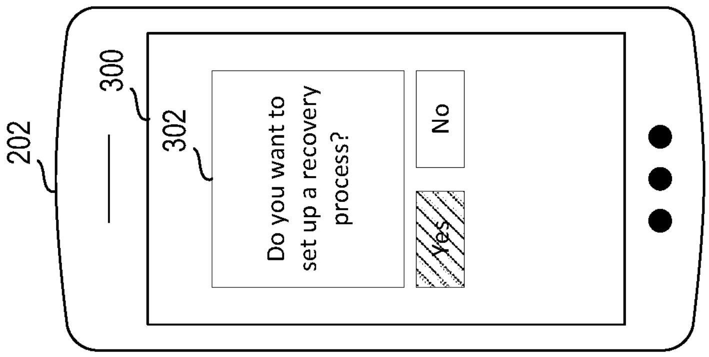
FIG. 3A illustrates an example view of a graphical user interface, according to example embodiments.

FIGS. 3A-3C illustrate a process for enrolling the user in an access code recovery process, according to example embodiments. FIG. 3A illustrates an example view of a graphical user interface 300 (hereinafter "GUI 300") presenting a first step of enrolling the user in the access code recovery process, according to example embodiments. In some embodiments, GUI 300 may refer or correspond to GUI 204 of FIG. 2. In some embodiments, GUI 300 may be a web page presented in a web browser application of client device 202. In some embodiments, GUI 300 may be a graphical user interface generated by security client 210.

As illustrated, GUI 300 may include a message 302. Message 302 may prompt the user to establish a recovery process for access code 214. Following confirmation, GUI 300 may be updated to include message 304. Message 304 may request that the user define the number of shares to be generated and the trusted users for those shares. For example, GUI 300 may include fields 306 that allow the user to provide an identifier of each trusted user. After the user inputs the number of shares and the trusted users, GUI 300 may prompt the user with message 308. Message 308 may request that the user define the number of shares required to reconstruct access code 214. In some embodiments, the number of shares, m, may be less than or equal to n and greater than or equal to 2.

Figure 4:
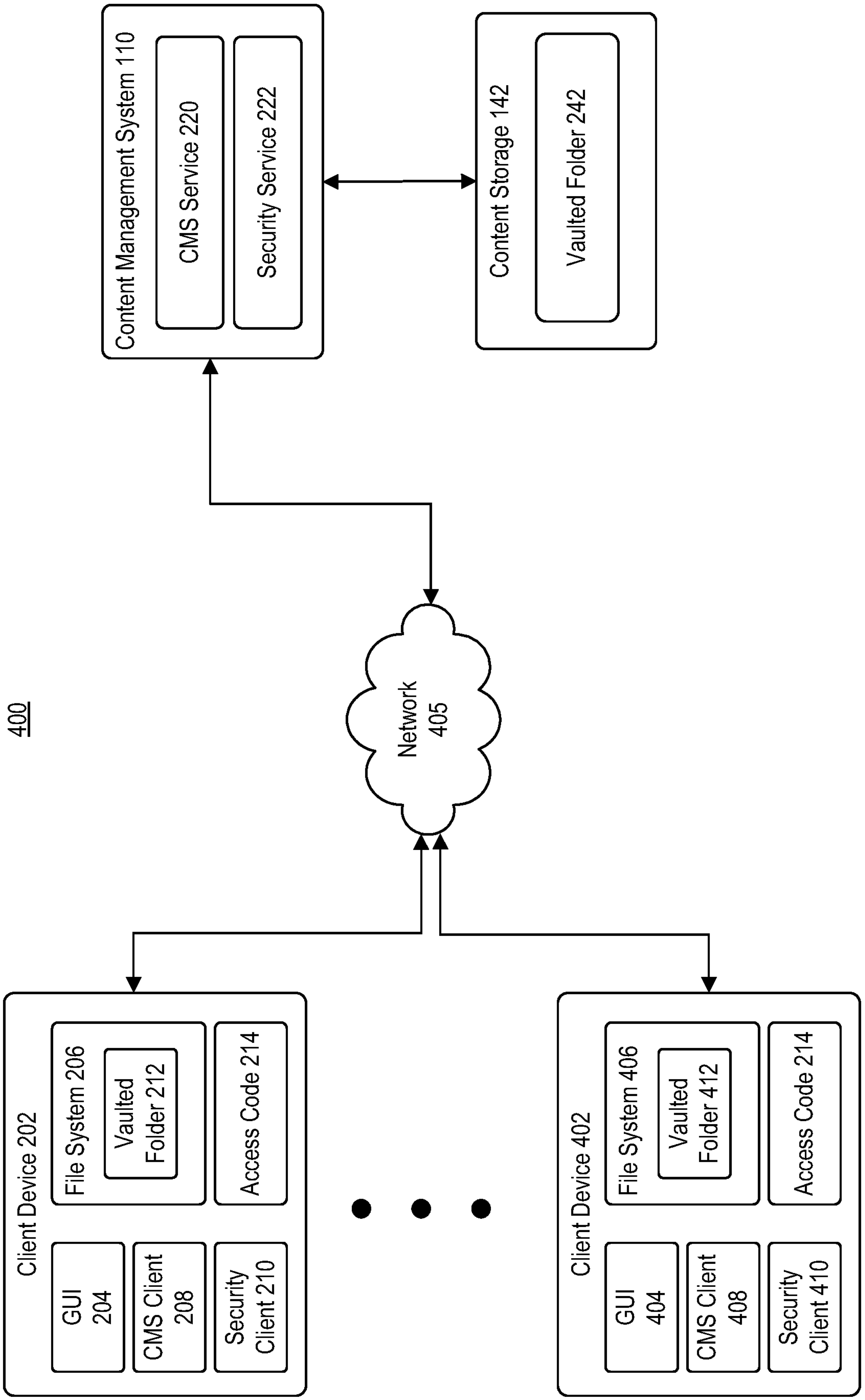
FIG. 4 illustrates an example system configuration of the content management system and client devices of FIG. 1, according to example embodiments.

FIG. 4 is a block diagram of an example system 400, according to example embodiments. In some embodiments, system 400 may correspond to system 100 described above. As illustrated, system 400 may include client device 402, client device 202, and content management system 110 communicating via network 405. Network 405 may be configured similar to network 105.

Client device 402 may include a graphical user interface (GUI) 404, a file system 406, a content management system (CMS) client 408, and a security client 410. User of client device 402 may view one or more content items (e.g., files, links, folders, workspaces, photos, passwords, etc.) associated with a user account via GUI 404. In some embodiments, user of client device 402 may be the same user as user of client device 202. For example, client device 402 may be another device or a replacement device of the user. In some embodiments, user of client device 402 may be a collaborator of the user of client device 202. Generally, GUI 404 may provide user of client device 202 with access to content items associated with the user's account.

File system 406 may be representative of a portion (e.g., a dedicated folder) of the file system of client device 402 that includes content items being managed by content management system 110. In some embodiments, content items stored in file system 406 may be automatically uploaded to or synchronized with file systems in content management system 110 and/or managed file systems on other client devices, such as client device 202.

CMS client 408 may be configured to authenticate the user with content management system 110. For example, CMS client 408 may be configured to initiate an authentication process during which a user may log in to their account managed by content management system 110. In some embodiments, CMS client 408 may further be configured to manage file system 406. When a user adds a content item to file system 406, CMS client 408 may communicate with content management system 110 to synchronize the content item with content management system 110, as described with reference to FIG. 1 above. Similarly, CMS client 408 may monitor items in file system 406 to determine when content items may have been opened, modified, moved, shared, deleted, etc., and which user has performed or is performing operations on the content items within file system 406.

In some embodiments, client device 402 may wish to access encrypted content items (e.g., files, folders, or other types of digital data) that are associated with vaulted folder 212. For example, client device 402 may wish to have vaulted folder 212 synchronized with its file system 406. To facilitate this process, security client 410 may request access code 214 from content management system 110. Content management system 110 may forward the request for access code 214 to client device 202. Once approved by client device 202, client device 202 may employ a secure exchange protocol with client device 402. For example, security client 210 may transfer access code 214 to security client 410 over a public network, such as through content management system 110.

Once received, security client 410 may use access code 214 to synchronize vaulted folder 212 with file system 406. In some embodiments, vaulted folder 412 may be created local to client device 402 during the synchronization.

In some embodiments, content management system 110 may limit the number of client devices a user can authorize. To monitor this, security service 222 may maintain a list of client devices that client device 202 has authorized. For example, in some embodiments, security service 222 may maintain a list of device IDs that are authorized to access vaulted folder 242. Accordingly, in some embodiments, if client device 402 requests access to access code 214, and the user has already authorized the maximum number of devices, content management system 110 may not permit authorization of client device 402. Instead, the user must revoke the authorization of one of their other authorized devices before authorization for client device 402 can proceed.

Figure 5:
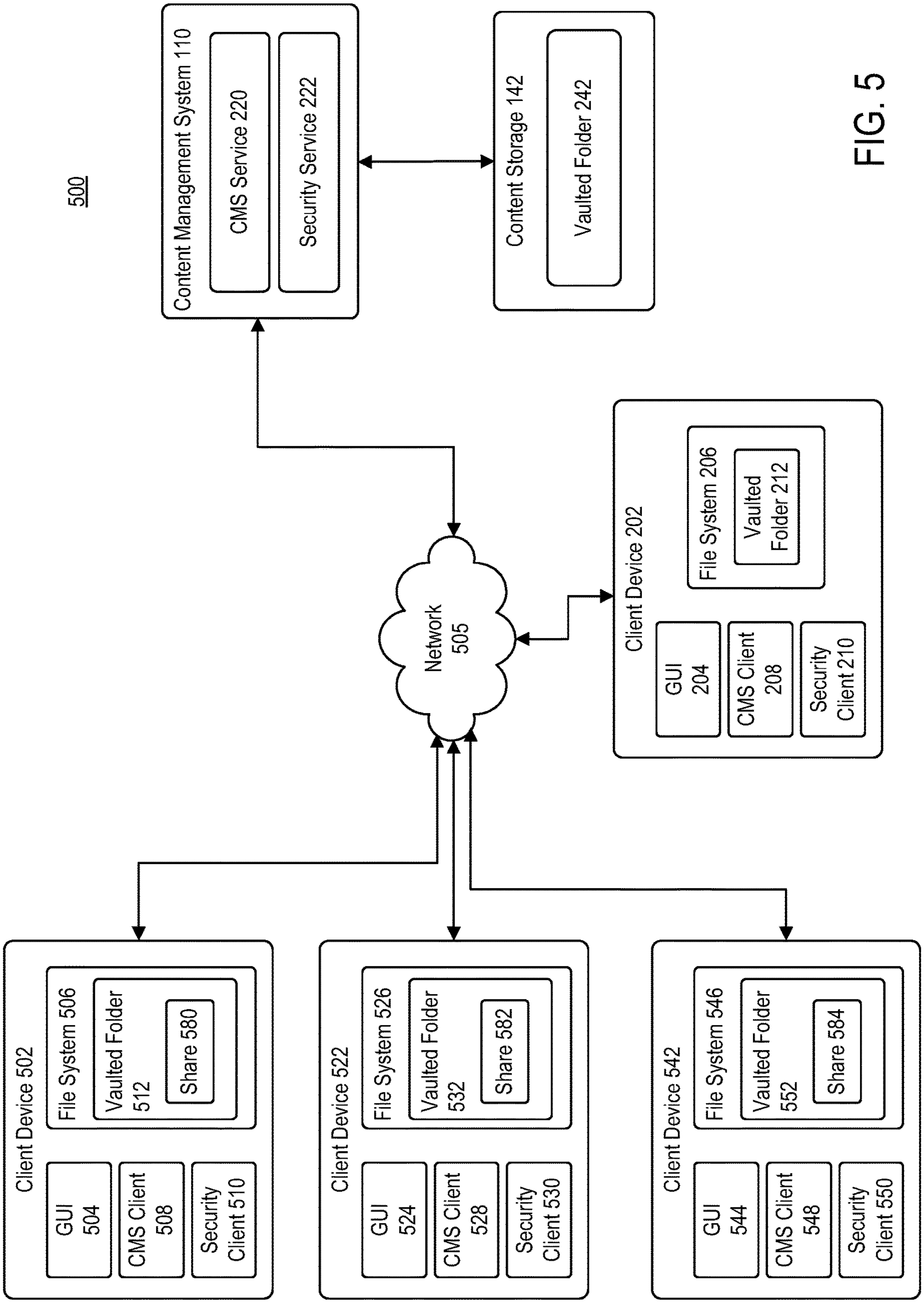
FIG. 5 illustrates an example system configuration of the content management system and client devices of FIG. 1, according to example embodiments.

FIG. 5 is a block diagram of an example system 500, according to example embodiments. In some embodiments, system 500 may correspond to system 100 described above. As illustrated, system 500 may include client device 502, client device 522, client device 542, client device 202, and content management system 110 communicating via network 505. Network 505 may be configured similar to network 105.

For case of discussion, client device 502, client device 522, and client device 542 may be configured similarly to client device 202 discussed above in conjunction with FIG. 2. For example, as shown, client device 502 may include GUI 504, file system 506, CMS client 508, and security client 510, similar to GUI 204, file system 206, CMS client 208, and security client 210. Client device 502 may also include a vaulted folder 512. Vaulted folder 512 may be configured similarly to vaulted folder 212; however, vaulted folder 512 may be accessed using an access code unique to client device 502. Client device 522 may include GUI 524, file system 526, CMS client 528, and security client 530, similar to GUI 204, file system 206, CMS client 208, and security client 210. Client device 522 may also include a vaulted folder 532. Vaulted folder 532 may be configured similarly to vaulted folder 212; however, vaulted folder 532 may be accessed using an access code unique to client device 522. Client device 542 may include GUI 544, file system 546, CMS client 548, and security client 550, similar to GUI 204, file system 206, CMS client 208, and security client 210. Client device 542 may also include a vaulted folder 552. Vaulted folder 552 may be configured similarly to vaulted folder 212; however, vaulted folder 552 may be accessed using an access code unique to client device 542.

As shown, each of client device 502, client device 522, and client device 542 may store a respective share of access code 214. For example, client device 502 may store share 580, client device 522 may store share 582, and client device 542 may store share 584. In some embodiments, each client device 502 may store share 582 in vaulted folder 512. In some embodiments, client device 522 may store share 582 in vaulted folder 532. In some embodiments, client device 542 may store share 584 in vaulted folder 552. Although each share 580-584 is shown stored in a respective vaulted folder, those skilled in the art understand that a given client device may store their respective share in any local storage.

In some embodiments, such as when a user of client device 202 loses access to access code 214, any of client device 502, client device 522, or client device 542 can initiate a recovery process for access code 214. In some embodiments, client device 202 may prompt one of client device 502, client device 522, or client device 542 to initiate the process.

For purposes of discussion, client device 502 may be considered the lead trusted device for the recovery process. In some embodiments, lead trusted device may only mean that client device 502 initiated the recovery process; not that client device 502 must initiate the recovery process, as any trusted client device can begin this process.

In some embodiments, security client 510 may prompt client device 522 and client device 542 to provide their share 582, 584, respectively, to client device 502. For example, security client 530 of client device 522 may prompt the user to send share 582 to client device 502. In some embodiments, security client 530 may employ a secure exchange protocol with client device 502. For example, security client 530 may transfer share 582 to security client 510 over a public network, such as through content management system 110. Similarly, security client 550 of client device 542 may prompt the user to send share 584 to client device 502. In some embodiments, security client 550 may employ a secure exchange protocol with client device 502. For example, security client 550 may transfer share 584 to security client 510 over a public network, such a through content management system 110.

Once client device 502 has possession of the minimum number, m, of required shares, security client 510 may reconstruct access code 214. Security client 510 may employ a secure exchange protocol with client device 202. For example, security client 510 may transfer reconstructed access code 214 to security client 210 over a public network, such as through content management system 110.

In some embodiments, rather than perform such process on one of client device 502, client device 522, or client device 542, client device 202 may receive the minimum number, m, of required shares in similar fashion. In this manner, client device 202 can reconstruct access code 214 locally, without revealing access code 214 to any of client device 502, client device 522, or client device 542.

In some embodiments, client device 202 may request a new access code once access code 214 is reconstructed. For example, once client device 202 is in possession of access code 214, security client 210 is able to decrypt vaulted folder 212. Once decrypted, security client 210 can generate a new access code to replace access code 214, and re-encrypt vaulted folder 212 with the new access code. In this manner, the user of client device 202 can be sure that none of client device 502, client device 522, or client device 542 may have access to vaulted folder 212.

Accordingly, in this manner, client device 202 may be able to recover content items stored in vaulted folder 212, even when the user loses access to their access code 214.

Figure 6:
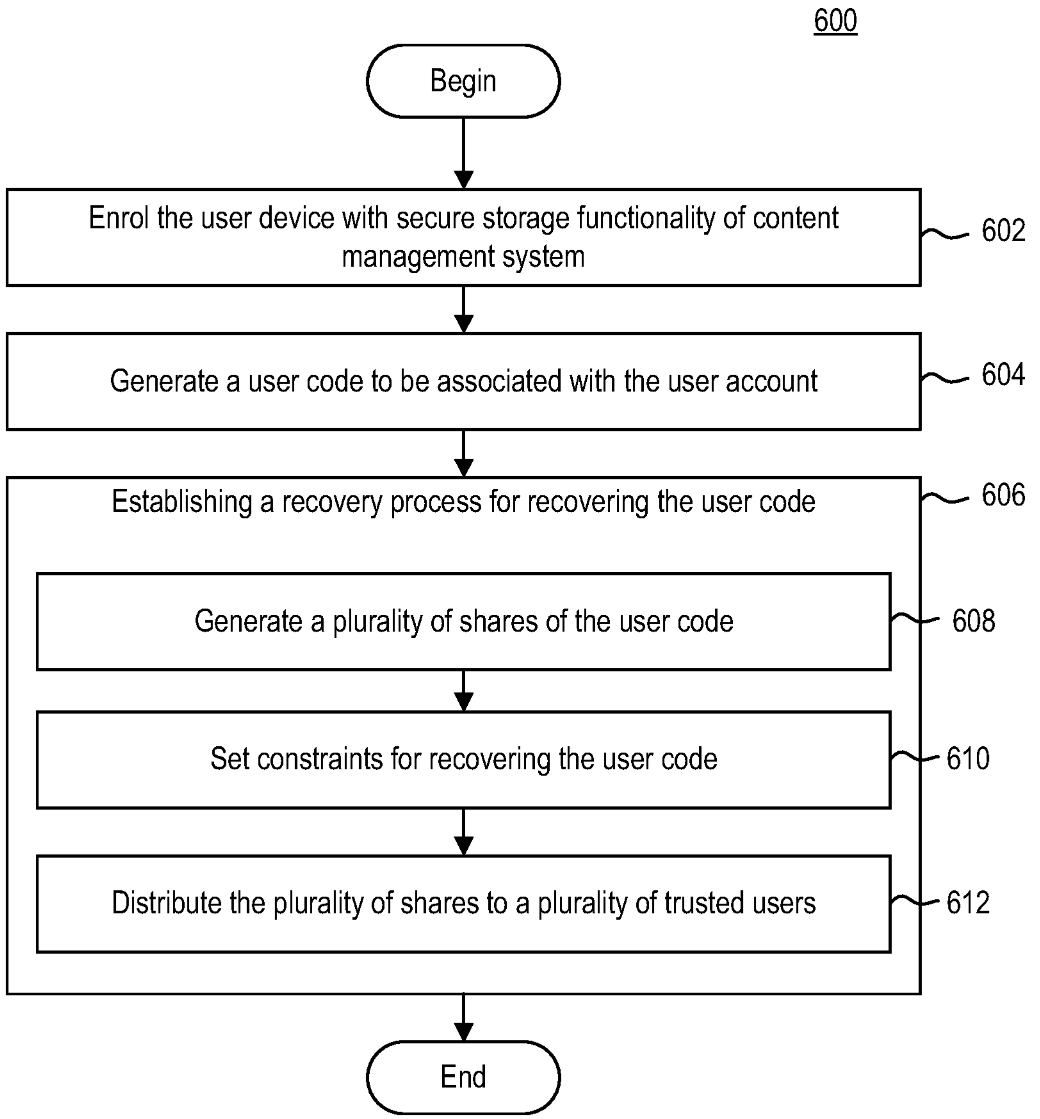
FIG. 6 is a flow diagram illustrating a method of enrolling a user in a recovery process, according to example embodiments.

FIG. 6 is a flow diagram illustrating a method 600 of enrolling a user in a recovery process, according to example embodiments. Method 600 may begin at step 602.

At step 602, security client 210 may enroll user with secure storage functionality of content management system 110. For example, security client 210 may send a request to content management system 110 for content management system 110 to enroll the user's account with secure storage functionality.

At step 604, security client 210 may generate an access code to be associated with the user's account. In some embodiments, security client 210 may generate the access code, responsive to receiving approval from content management system 110 for secure storage functionality. Access code may be used by security client 210 to encrypt content items prior to upload to content management system 110. For example, client device 202 may include a vaulted folder 212 in file system 206. Security client 210 may encrypt content items using the access code prior to storage in vaulted folder 212. In this manner, when vaulted folder 212 is synchronized with content management system 110, content management system 110 is unable to view the contents of vaulted folder 212. Thus, content management system 110 may employ a zero-knowledge encryption architecture for secure storage.

At step 606, security client 210 may establish a recovery process for recovering the user's access code. For example, because content management system 110 employs a zero-knowledge encryption architecture, content management system 110 is unable to restore the user's access code, if the user loses access to the access code. Accordingly, security client 210 may establish a recovery process through which multiple parties can work in unison to reconstruct the user's access code, without revealing the access code to content management system 110. Step 606 may include steps 608-612.

At step 608, security client 210 may generate a plurality of shares of the access code. For example, security client 210 may employ a secret sharing technique to generate a plurality of shares (e.g., n shares) of the access code. In some embodiments, security client 210 may prompt the user to indicate a number of shares to be generated. Given the number of shares, security client 210 may generate a polynomial to generate the n shares of the access code.

At step 610, security client 210 may set constraints for recovering the access code. For example, security client 210 may prompt the user to define a minimum number of shares required to reconstruct the access code. In some embodiments, the minimum number of shares may be greater than or equal to two, but less than or equal to m.

At step 612, security client 210 may distribute the plurality of shares to a plurality of trusted client devices. For example, as part of establishing the recovery process, security client 210 may prompt the user to indicate a plurality of trusted users. Each of the plurality of trusted users may be provided with a share of the plurality of shares. In this manner, any trusted user of the plurality of trusted users can reconstruct the access code with the minimum required number of shares.

In some embodiments, security client 210 may securely distribute the number of shares to a trusted client device using a secure exchange protocol. For example, security client 210 may transfer access code to a security client executing on a trusted device over a public network, such as through content management system 110.

Figure 7:
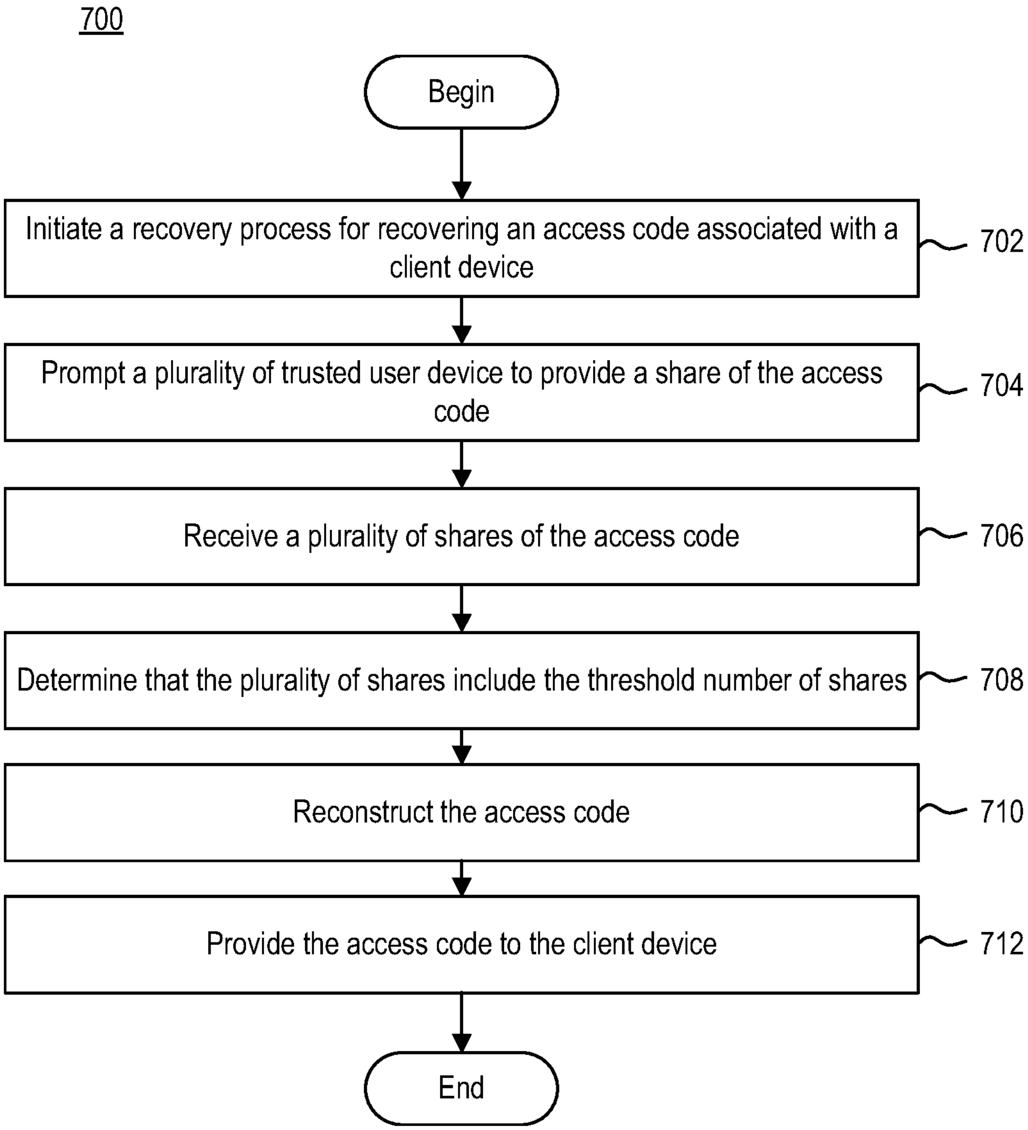
FIG. 7 is a flow diagram illustrating a method of performing a recovery process for a user's access code, according to example embodiments.

FIG. 7 is a flow diagram illustrating a method 700 of performing a recovery process for a user's access code, according to example embodiments. Method 700 may begin at step 702.

At step 702, a trusted client device (e.g., client device 502) may initiate a recovery process for recovering an access code associated with another user (e.g., client device 202). In some embodiments, trusted client device may initiate the recovery process responsive to receiving a prompt from the user of client device 202.

At step 704, trusted client device may prompt a plurality of trusted client devices to provide a share of their access code. For example, security client 510 may communicate with one or more other trusted client devices to prompt each client device to provide their share of the user's access code to client device 502. In some embodiments, each trusted client device may receive a push notification from their respective security client to provide or approve the sending of their share of the access code to client device 502.

At step 706, trusted client device may receive a plurality of shares from the plurality of client devices. In some embodiments, trusted client device may receive each share through a secure exchange protocol. For example, trusted client device may receive each share of the user's access code over a public network, such as through content management system 110.

At step 708, trusted client device may determine that the plurality of shares include the threshold number of shares. As indicated previously, the user of client device 202 may define the minimum number of shares that may be required to reconstruct the user's access code. If trusted client device does not receive the minimum number of shares, the trusted client device is unable to reconstruct the access code.

At step 710, trusted client device may reconstruct the access code. For example, security client 510 may reconstruct the access code by evaluating the plurality of shares received by the plurality of trusted devices. In some embodiments, each share of the plurality of shares may be distinct. In other words, in some embodiments, no two trusted devices may have the same share. Security client 510 can recover or reconstruct the access code using the plurality of shares and the established secret sharing schema from which the plurality of shares was derived (e.g., Shamir's secret sharing schema).

At step 712, trusted client device may provide the access code to client device 202. For example, once the access code is reconstructed, trusted client device may employ a secure exchange protocol to provide the reconstructed access code to client device 202. For example, security client 510 may transfer access code to security client 210 executing on client device 202 over a public network, such as through content management system 110.

In this manner, client device 202 is able to re-obtain its access code in a zero-knowledge encryption architecture.

Figure 8A:
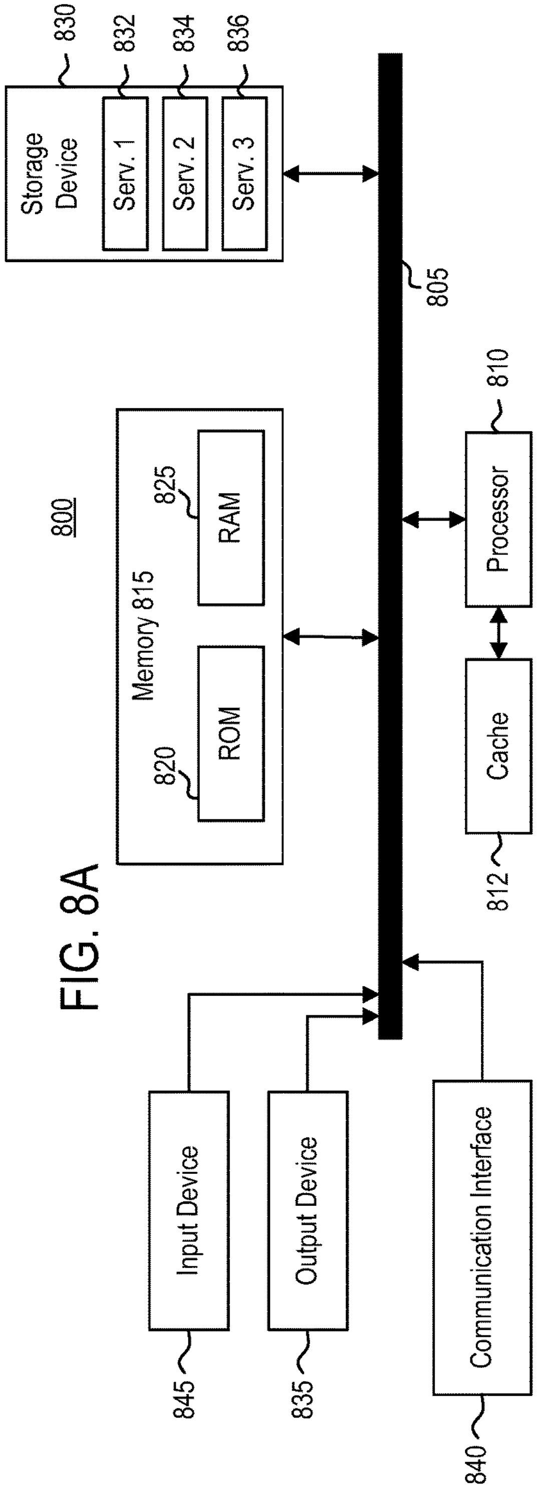
FIG. 8A illustrates an example system configuration for implementing various embodiments of the present technology, according to example embodiments.

FIG. 8A illustrates a bus computing system architecture of system 800, according to example embodiments. One or more components of system 800 may be in electrical communication with each other using a bus 805. System 800 may include a processing unit (e.g., one or more CPUs, GPUs or other types of processors) 810 and a system bus 805 that couples various system components including the system memory 815, such as read only memory (ROM) 820 and random access memory (RAM) 825, to processor 810. System 800 can include a cache of high-speed memory connected directly with, in close proximity to, or integrated as part of processor 810. System 800 can copy data from memory 815 and/or storage device 830 to cache 812 for quick access by processor 810. In this way, cache 812 may provide a performance boost that avoids processor 810 delays while waiting for data. These and other modules can control or be configured to control processor 810 to perform various actions. Other system memory 815 may be available for use as well. Memory 815 may include multiple different types of memory with different performance characteristics. Processor 810 may be representative of a single processor or multiple processors. Processor 810 can include one or more of a general purpose processor or a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the system 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with system 800. Communications interface 840 can generally govern and manage the user input and system output. There is no restriction on operating on any particular hardware arrangement and therefore the basic features here may easily be substituted for improved hardware or firmware arrangements as they are developed.

Storage device 830 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 can include services 832, 834, and 836 for controlling the processor 810. Other hardware or software modules are contemplated. Storage device 830 can be connected to system bus 805. In one aspect, a hardware module that performs a particular function can include the software component stored in a computer-readable medium in connection with the necessary hardware components, such as processor 810, bus 805, output device 835, and so forth, to carry out the function.

Figure 8B:
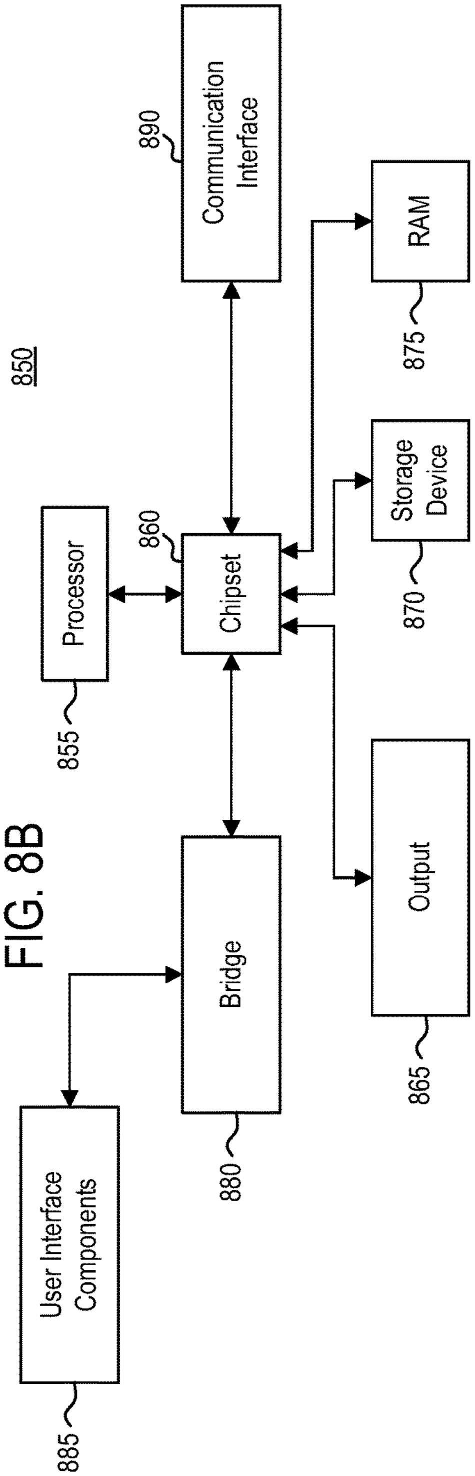
FIG. 8B illustrates an example system configuration for implementing various embodiments of the present technology, according to example embodiments.

FIG. 8B illustrates a computer system 850 having a chipset architecture that can be used in executing the described method and generating and displaying a graphical user interface (GUI). Computer system 850 may be an example of computer hardware, software, and firmware that can be used to implement the disclosed technology. System 850 can include one or more processors 855, representative of any number of physically and/or logically distinct resources capable of executing software, firmware, and hardware configured to perform identified computations. One or more processors 855 can communicate with a chipset 860 that can control input to and output from one or more processors 855. In this example, chipset 860 outputs information to output 865, such as a display, and can read and write information to storage device 870, which can include magnetic media, and solid state media, for example. Chipset 860 can also read data from and write data to storage RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal arca networks. Some applications of the methods for generating, displaying, and using the GUI disclosed herein can include receiving ordered datasets over the physical interface or be generated by the machine itself by one or more processors 855 analyzing data stored in storage device 870 or RAM 875. Further, the machine can receive inputs from a user through user interface components 885 and execute appropriate functions, such as browsing functions by interpreting these inputs using one or more processors 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A system, comprising:
a first client device configured to perform functions of:
initiating an enrollment process between the first client device and a content management system;
generating an access code for encrypting and/or decrypting content items associated with a user account, wherein the access code is not entirely exposed to the content management system;
using, prior to uploading to the content management system, the access code to encrypt a content item to provide an encrypted content item;
uploading the encrypted content item, as generated by the access code, to the content management system; and
establishing an access-code recovery process comprising:
generating a plurality of shares of the access code by dividing the access code into the plurality of shares that can be combined to reconstruct the access code; and
distributing the plurality of shares to a plurality of trusted devices, wherein at least a subset of the plurality of shares is required for reconstructing the access code; and
a second client device configured to perform functions of:
receiving a request to access the encrypted content item;
determining that the second client device does not have access to the access code;
responsive to determining that the second client device does not have access to the access code, blocking access to the encrypted content item; and
receiving a representation of the access code from a trusted device, of the plurality of trusted devices, that initiated the access-code recovery process.

2. The system of claim 1, wherein the first client device is further configured to perform functions of:
uploading the encrypted content item to the user account.

3. The system of claim 2, wherein the first client device is further configured to perform functions of:
sending a request to access the encrypted content item to a content management system, wherein the content management system determines that the first client device does not have access to the access code; and
receiving an indication that the first client device does not have access to the encrypted content item.

4. The system of claim 1, wherein the first client device is further configured to perform functions of:
initiating the access-code recovery process with the trusted device, of the plurality of trusted devices, that is configured to prompt the plurality of trusted devices to provide their share of the access code; and
receiving a representation of the access code from the trusted device, that initiated the access-code recovery process, and the plurality of trusted devices.

5. The system of claim 1, wherein the first client device is further configured to perform functions of:
receiving a second request from the second client device to gain access to the content items; and
granting the second request to the second client device, wherein granting the second request to the second client device comprises sending the access code from the client device to the second client device.

6. The system of claim 1, wherein the user account comprises a vaulted folder comprising the content items.

7. The system of claim 1, wherein the content management system comprises at least one trusted device of the plurality of trusted devices.

8. The system of claim 1, wherein the first client device is further configured to establish the access-code recovery process for recovering the access code by:
defining a time duration during which the access-code recovery process will be unavailable.

9. The system of claim 8, wherein the time duration begins following a most recent authentication between the content management system and the first client device using the access code.

10. A non-transitory computer readable medium comprising:
a first set of instructions that, when executed by a first client device, cause the first client device to:
initiate an enrollment process between the first client device and a content management system (CMS);
generate an access code for encrypting and/or decrypting content items associated with a user account, wherein the access code is not entirely exposed to the CMS;
use, prior to uploading to the content management system, the access code to encrypt a content item to provide an encrypted content item; and
upload the encrypted content item, as generated by the access code, to the content management system;
establish an access-code recovery process comprising:
generate a plurality of shares of the access code by dividing the access code into the plurality of shares that can be combined to reconstruct the access code; and
distribute the plurality of shares to a plurality of trusted devices, wherein at least a subset of the plurality of shares is required for reconstructing the access code; and
a second set of instructions that, when executed by a second client device, cause the second client device to:
receive a request to access the encrypted content item;
determine that the second client device does not have access to the access code;
responsive to determining that the second client device does not have access to the access code, block access to the encrypted content item; and
receive a representation of the access code from a trusted device, of the plurality of trusted devices, that initiated the access-code recovery process.

11. The non-transitory computer readable medium of claim 10, wherein the first set of instructions further cause the first client device to:
send the request to access the encrypted content item to the CMS, wherein the CMS determines that the first client device does not have access to the access code; and
receive an indication that the first client device does not have access to the encrypted content item.

12. The non-transitory computer readable medium of claim 10, wherein the first set of instructions further cause the first client device to:

initiate the access-code recovery process with the trusted device, wherein the trusted device is configured to prompt the plurality of trusted devices to provide their share of the access code; and receive the representation of the access code from the trusted device, that initiated the access-code recovery process, and the plurality of trusted devices.

13. The non-transitory computer readable medium of claim 10, wherein the first set of instructions further cause the first client device to:

transmit a request to the CMS to transfer the access code to the second client device;

in response to the CMS granting the request, establish a secure exchange protocol with the second client device to send the access code from the first client device to the second client device; and forward the access code to the second client device.

14. The non-transitory computer readable medium of claim 10, wherein the user account comprises a vaulted folder comprising the content items.

15. The non-transitory computer readable medium of claim 10, wherein the content management system is one trusted device of the plurality of trusted devices.

16. The non-transitory computer readable medium of claim 10, wherein the first set of instructions cause the first client device to establish the access-code recovery process for recovering the access code by further causing the first client device to:

define a time duration during which the access-code recovery process will be unavailable.

17. The non-transitory computer readable medium of claim 10, wherein a time duration begins following a most recent authentication between the content management system and the first client device using the access code.

18. A method, comprising:

facilitating, by a content management system (CMS), an enrollment process between a first client device and the CMS, wherein the enrollment process is initiated by the first client device;

causing the first client device to execute functions comprising:

generating an access code for encrypting and/or decrypting content items associated with a user account, wherein at most a share of the access code is not entirely exposed to the content management system and the content management system is designated as a trusted user to facilitate a recovery process;

using, prior to uploading to the content management system, the access code to encrypt a content item to provide an encrypted content item;

uploading the encrypted content item, as generated by the access code, to the content management system; and establishing an access-code recovery process comprising:

generating a plurality of shares of the access code by dividing the access code into the plurality of shares that can be combined to reconstruct the access code, and distributing the plurality of shares to a plurality of trusted devices, wherein at least a subset of the plurality of shares is required for reconstructing the access code;

causing a second client device to execute functions comprising:

receiving a request to access the encrypted content item;

determining that the second client device does not have access to the access code;

responsive to determining that the second client device does not have access to the access code, blocking access to the encrypted content item; and receiving a representation of the access code from a trusted device, of the plurality of trusted devices, that initiated the access-code recovery process;

receiving, by a server, a first share of the plurality of shares of the access code;

limiting, by the server, access to a vaulted folder based on the access code; and enabling, by the server, the access-code recovery process, wherein enabling the access-code recovery process is initiated by the first client device.

19. The method of claim 18, wherein enabling the recovery process comprises:

prompting, by the server hosting the content management system, the plurality of trusted devices to provide their respective shares of the access code to the first client device via secure communication;

facilitating, by the server, a secure exchange protocol to enable transfer of the shares from the plurality of trusted devices to the first client device over a public network;

generating, by the server, a reconstructed access code by the first client device upon receipt of a minimum threshold number of shares; and facilitating a secure transfer of the reconstructed access code from the first client device to another device using the secure exchange protocol.

20. The method of claim 18, causing the first client device to execute functions further comprising:

transmitting a request to the content management system (CMS) to transfer the access code to the second client device; and in response to the CMS granting the request, forwarding the access code from the first client device to the second client device.

* * * * *